United States Patent [19]

Dziurowitz

[11] Patent Number: 4,936,005
[45] Date of Patent: Jun. 26, 1990

[54] METHOD OF REPAIRING A LAY SHAFT

[76] Inventor: Karl H. Dziurowitz, 317 Mildred, Alton, Ill. 62002

[21] Appl. No.: 360,064

[22] Filed: Jun. 1, 1989

[51] Int. Cl.$^5$ .......................... B23P 7/00; B23P 19/04
[52] U.S. Cl. ............................... 29/402.04; 29/402.08; 29/402.12; 29/402.14; 29/402.15; 29/464; 29/525.1; 403/305
[58] Field of Search .................... 29/156.4 R, 402.01, 29/402.03, 402.04, 402.08, 402.09, 402.11, 402.12, 402.14, 402.15, 402.17, 426.4, 464, 525.1; 403/305 X, 306, 312, 313; 138/97 X, 98, 99

[56] References Cited

U.S. PATENT DOCUMENTS

| | | | |
|---|---|---|---|
| 833,349 | 10/1906 | Starkey et al. | 403/305 |
| 1,469,304 | 6/1921 | Hughes | 403/305 |
| 4,038,737 | 8/1977 | Bretone, Jr. | |
| 4,172,472 | 10/1979 | Parrish | |
| 4,218,812 | 8/1980 | Jönsson | 29/402.12 |
| 4,581,801 | 4/1986 | Kobuck et al. | |
| 4,713,870 | 12/1987 | Szalvay | |
| 4,747,430 | 5/1988 | Stata et al. | |

Primary Examiner—Joseph M. Gorski
Assistant Examiner—S. Thomas Hughes
Attorney, Agent, or Firm—Leon Gilden

[57] ABSTRACT

A lay shaft repair kit and a method for its use is set forth wherein a lay shaft is utilized in a fuel injector control linkage and provides for the removal of a forward portion of the shaft, its replacement, and its splicing to the original lay shaft portion utilizing a rectangular parallelepiped splicing block formed with a through-extending cylindrical bore therethrough offset relative to the forward and rear end walls of the block. A slot is directed diametrically aligned and medially through the right side wall of the block. A series of threaded apertures are aligned orthogonally through the slot to effect a pinching of the slot about the original and replacement shaft portions. The original and replacement shaft portions are formed with through-extending bores and aligned with through-extending block bores to receive interlocking pins therethrough to secure the shaft portions to the splicing block to effect a repair of the lay shaft.

1 Claim, 1 Drawing Sheet

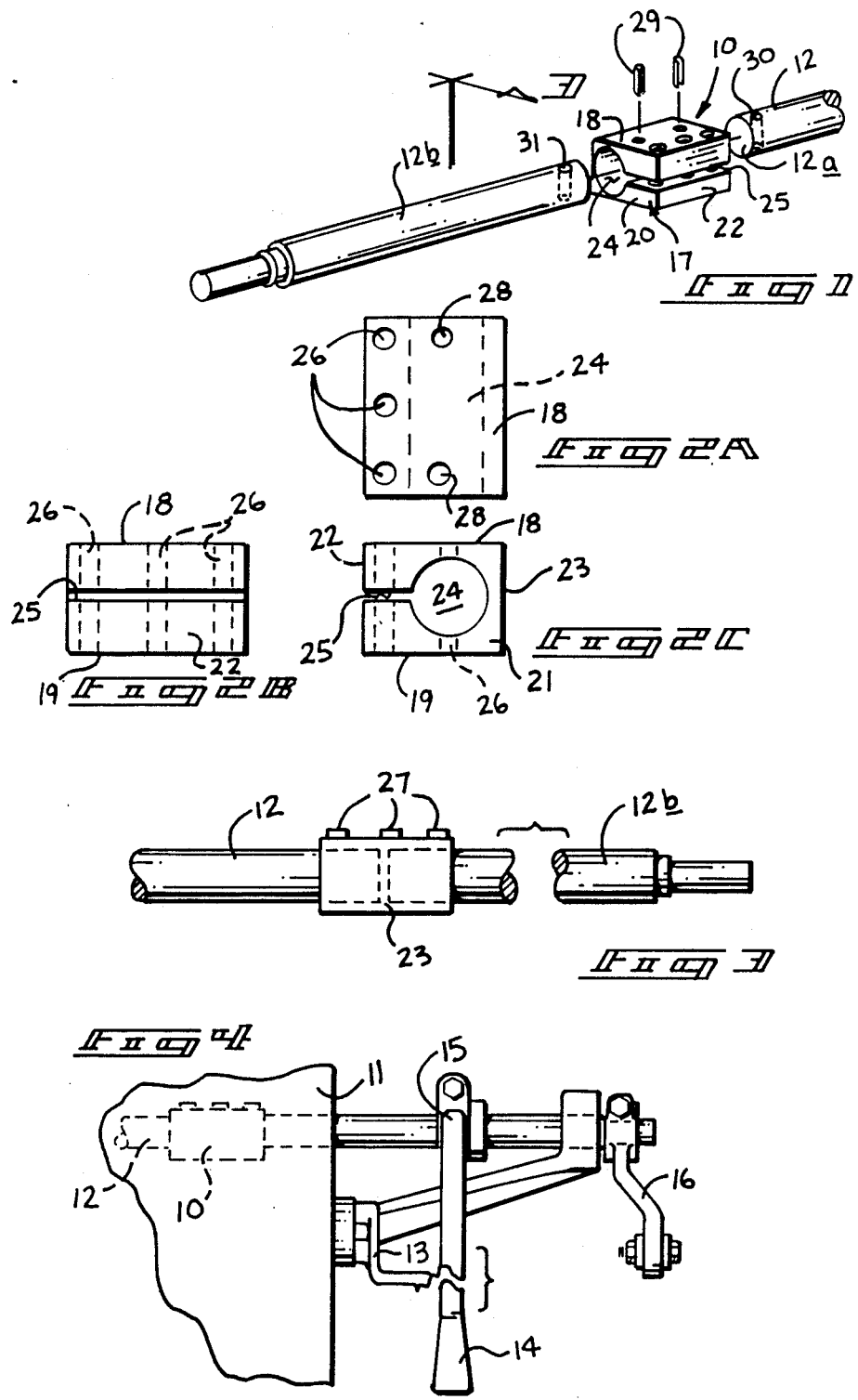

1

METHOD OF REPAIRING A LAY SHAFT

BACKGROUND OF THE INVENTION

1. Field of the Invention

The field of invention relates to engine repair, and more particularly pertains to a new and improved lay shaft repair kit and method for replacement of a worn portion of a fuel injector lay shaft control linkage, as typically utilized with an electric motive division engine.

2. Description of the Prior Art

The use of clamping pipes and the like is known in the prior art. Heretofore such repairing devices have failed to accommodate a portion of a fuel injector control shaft known as a "lay shaft" without removal of such shaft from the engine assembly. Examples of splicing devices for tubular members may be found in U.S. Pat. No. 4,038,737 to Bretone utilizing an annular sealing ring to secure plural portions of sewage pipe together.

Similarly, U.S. Pat. No. 4,172,472 to Parrish sets forth a clamping assembly to surroundingly engage a pipe portion and apply a clamping force to the clamping member.

U.S. Pat. No. 4,581,801 to Kobuck, et al., sets forth a method of inserting a metal sleeve within a tube to bridge defective portions of the tube.

U.S. Pat. No. 4,718,870 to Szalvay sets forth a pipe repair sleeve apparatus to expand a repair sleeve within a pipe to extend beyond either side of the portion of the pipe to be repaired.

U.S. Pat. No. 4,747,430 to Stata sets forth a split cylindrical sleeve comprised of two half shelves to be expanded within a pipe structure to repair such structure.

As such, it may be appreciated that there is a continuing need for a new and improved lay shaft repair kit and method as set forth by the instant invention that overcomes the problems of ease of use and effectiveness in application, and in this respect, the present invention substantially fulfills this need.

SUMMARY OF THE INVENTION

In view of the foregoing disadvantages inherent in the known types of cylindrical tube repair kits now present in the prior art, the present invention provides a lay shaft repair kit and method wherein the same enables replacement of a lay shaft of a fuel injector organization of an associated engine without removal of a complete lay shaft to effect such repair. As such, the general purpose of the present invention, which will be described subsequently in greater detail, is to provide a new and improved lay shaft repair kit and method which has all the advantages of the prior art shaft repair methods and none of the disadvantages.

To attain this, the present invention includes a lay shaft associated with an existing engine block wherein the shaft extends beyond the engine block and is severed somewhat interiorly overlying the engine block whereupon a replacement shaft is positioned in alignment with the original lay shaft and spliced thereto by means of a rectangular parallelepiped clamp utilizing threaded fasteners directed through a slot to tighten the slot and an associated through-extending cylindrical bore diametrically aligned with the slot. A plurality of spaced smooth bores are diametrically directed through the cylindrical bore to receive securement pins therethrough wherein the securement pins are received within bores formed within the original and replacement lay shaft portions to secure those portions within the cylindrical bore and enable subsequent tightening of the clamp upon tightening of the threaded fasteners through the slot.

My invention resides not in any one of these features per se, but rather in the particular combination of all of them herein disclosed and claimed and it is distinguished from the prior art in this particular combination of all of its structures for the functions specified There has thus been outlined, rather broadly, the more important features of the invention in order that the detailed description thereof that follows may be better understood, and in order that the present contribution to the art may be better appreciated. There are, of course, additional features of the invention that will be described hereinafter and which will for the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lay shaft repair kit and method which has all the advantages of the prior art shaft repair kits and none of the disadvantages.

It is another object of the present invention to provide a new and improved lay shaft repair kit and method which may be easily and efficiently manufactured and marketed.

It is a further object of the present invention to provide a new and improved lay shaft repair kit and method which is of a durable and reliable construction.

An even further object of the present invention is to provide a new and improved lay shaft repair kit and method which is susceptible of a low cost of manufacture with regard to both materials and labor, and which accordingly is then susceptible of low prices of sale to the consuming public, thereby making such lay shaft repair kits and methods economically available to the buying public.

Still yet another object of the present invention is to provide a new and improved lay shaft repair kit and method which provides in the apparatuses and methods of the prior art some of the advantages thereof, while simultaneously overcoming some of the disadvantages normally associated therewith.

Still another object of the present invention is to provide a new and improved lay shaft repair kit and method wherein the same enables repair of an associated lay shaft in operative association with a fuel injector system without removal of the complete lay shaft from the engine assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the repair kit and its association with the original and replacement lay shaft.

FIG. 2a is a top orthographic view of the lay shaft repair block.

FIG. 2b is an isometric side view taken in elevation of the lay shaft repair block.

FIG. 2c is an orthographic end view taken in elevation of the lay shaft repair block.

FIG. 3 is an orthographic rear view taken in elevation of the lay shaft repair block and its association with the original and replacement lay shaft.

FIG. 4 is an orthographic side view taken in elevation of the lay shaft and its association with an engine block.

DESCRIPTION OF THE PREFERRED EMBODIMENT

With reference now to the drawings, and in particular to FIGS. 1 to 4 thereof, a new and improved lay shaft repair kit and method embodying the principles and concepts of the present invention and generally designated by the reference numeral 10 will be described.

More specifically, the lay shaft repair kit and method 10 essentially comprises repair of a lay shaft 12 associated with a fuel injector control linkage positioned upon an engine block 11. A support bracket 13 is secured to a forward end of the engine block for positioning of a hand control injector lever 14 that includes a lay shaft support boss 15 and spaced therefrom a link assembly 16 associated with a parallel series of injectors associated with a similar lay shaft.

The lay shaft repair kit includes a rectangular parallelepiped splicing block 17 formed with parallel spaced top and bottom walls 18 and 19, spaced and parallel forward and rear end walls 20 and 21, and spaced and parallel right side wall and left side wall 22 and 23. The splicing block includes a through-extending cylindrical bore 24 offset towards the left side wall 23 with its axis parallel to each right and left side wall and medially thereof. A slot 25 is directed through the right side wall and directed orthogonally and medially thereof in alignment with an axis defined by the cylindrical bore 24. A series of three threaded bores 26 are directed orthogonally through the slot 25 to threadedly receive three threaded fasteners 27 that are directed through the top wall 18 and received within the bottom wall 19 when positioned through the bores 26. A plurality of spaced through-extending bores 28 extend through the top and bottom walls 18 and 19 and are orthogonally directed through the axis of the cylindrical bore 24. These smooth bores 28 receive securement pins 29 that form an interference fit through the smooth through-extending bores 28. The securement pins will be received within a lay shaft bore 30 and a replacement lay shaft bore 31, as illustrated in FIG. 1 for example. In practice, the support bracket 13, the hand fuel injector control 14 and the link assembly are each removed from the engine block whereupon the original lay shaft 12 is severed and positioned approximately thirteen to fifteen inches rearwardly of a forward end of the lay shaft and defines a forward severed end 12a. This forward severed end 12a is formed with a lay shaft bore 30 directed orthogonally therethrough for positioning within the splicing block 17, as noted above. Similarly, the replacement shaft 12b, approximately thirteen to fourteen inches long, is formed with the aforenoted lay shaft bore 31 directed orthogonally through the axis of the replacement lay shaft for alignment with the forward smooth bore 28 and to receive an associated securement pin 29 therethrough that secures the original and replacement lay shaft and splices same together, as illustrated in FIGS. 1, 8, and 4. Finally, the threaded fasteners are directed through their associated threaded bores 26 to create a squeezing of the original lay shaft 12 and replacement lay shaft portion 12b within the block 17 whereupon the original support bracket 13, hand control injector lever 14 and link assembly 16 are replaced onto the new lay shaft replacement portion 12b to effect the repair of the lay shaft rod and provide a replacement bearing surface and the like for those portions of the lay shaft that have been worn unacceptably.

As to the manner of usage and operation of the present invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of repairing a lay shaft including the steps of,
   providing an engine block including at least one elongate lay shaft, wherein said lay shaft extends along the engine block and terminates at a position forwardly of the engine block with at least one support bracket and linkage assembly secured to the lay shaft forwardly of the engine block,
   removing the support bracket and linkage assembly from the at least one lay shaft,
   severing the at least one lay shaft at a position overlying the engine block, removing a forward portion of the at least one lay shaft thusly severed, and splicing a replacement forward lay shaft portion in axial alignment with the at least one severed lay shaft, and wherein the step of splicing a replacement forward lay shaft portion in axial alignment with the at least one severed lay shaft includes providing a parallelepiped splicing block formed with a top and bottom wall, a forward and rear end wall, and a right and left side wall, and including the step of forming the splicing block with a through-extending cylindrical bore having a longitudinal axis and having a diameter complementary to the at least one severe shaft and the replacement lay shaft portion, and forming a slot through the right side wall completely through the splicing block in diametrically positioned alignment with the through-extending cylindrical bore, and forming a first and second smooth bore orthogonally through the longitudinal axis which smooth bores extend from the top wall through the bottom wall, and further including the step of forming a bore through the replacement lay shaft portion and forming a further bore through the at least one severed lay shaft adjacent its forward terminal end, and positioning the bore and the further bore in alignment with the smooth bores by inserting the at least one severed lay shaft and the replacement lay shaft portion within the through-extending cylindrical bore and directing securement pins through the smooth bores and the bore and further bore of the replacement lay shaft portion and the at least one severed lay shaft respectively and maintaining these securement pins within these bores, and further including the step of forming a plurality of threaded bores extending from the top wall through the bottom wall directed orthogonally through the slot, and positioning threaded fasteners through the threaded bores, and tightening the threaded fasteners, thereby squeezing the splicing block about the at least one severed lay shaft and the replacement lay shaft portion, and replacing the support bracket and linkage assembly.

* * * * *